United States Patent
Steiger et al.

(10) Patent No.: US 12,090,494 B2
(45) Date of Patent: Sep. 17, 2024

(54) CYCLONE SEPARATOR PARTICULARLY FOR A POWDER RECOVERY DEVICE OF A POWDER COATING SYSTEM

(71) Applicant: GEMA SWITZERLAND GMBH, St. Gallen (CH)

(72) Inventors: Peter Steiger, Gossau (CH); Thomas Studerus, Engelburg (CH)

(73) Assignee: GEMA SWITZERLAND GMBH, St. Gallen (CH)

( * ) Notice: Subject to any disclaimer, the term of this patent is extended or adjusted under 35 U.S.C. 154(b) by 7 days.

(21) Appl. No.: 18/045,721

(22) Filed: Oct. 11, 2022

(65) Prior Publication Data

US 2023/0111882 A1     Apr. 13, 2023

(30) Foreign Application Priority Data

Oct. 11, 2021 (DE) .................... 10 2021 126 241.0

(51) Int. Cl.
*B05B 14/45*     (2018.01)
*B04C 5/15*      (2006.01)
(Continued)

(52) U.S. Cl.
CPC ............... *B04C 5/185* (2013.01); *B04C 5/15* (2013.01); *B04C 9/00* (2013.01); *B04C 11/00* (2013.01);
(Continued)

(58) Field of Classification Search
CPC .. B04C 5/185; B04C 5/15; B04C 9/00; B04C 11/00; B04C 2009/004; B04C 2009/005;
(Continued)

(56) References Cited

U.S. PATENT DOCUMENTS 2,534,702 A * 12/1950 Driessen ................. B04C 5/081
  210/512.1
4,133,658 A *  1/1979 Callewyn ............... B01D 45/12
  55/357

(Continued)

FOREIGN PATENT DOCUMENTS

DE     102008056369 A1 *  5/2010 ............... B04C 5/14

OTHER PUBLICATIONS

German Office Action dated Jun. 22, 2022, for corresponding German Application No. 10 2021 126 241.0.

*Primary Examiner* — Dung H Bui
(74) *Attorney, Agent, or Firm* — Kinney & Lange, P.A.

(57) ABSTRACT

A cyclone separator for a powder recovery device of a powder coating system includes an inlet region with an inlet for a mixed flow of powder/air, a separation region adjoining the lower end region of the inlet region for the centrifugal separation of at least a portion of the powder contained in the mixed flow, and a powder collecting region connected or connectable to the lower end region of the separation region for collecting the powder separated in the separation region. The powder collecting region is shiftable relative to the separation region between a first position in which the powder collecting region is aligned in flush connection with the lower end region of the separation region and a second position in which the powder collecting region is not aligned in flush connection with the lower end region of the separation region.

11 Claims, 7 Drawing Sheets

(51) Int. Cl.
  *B04C 5/185* (2006.01)
  *B04C 9/00* (2006.01)
  *B04C 11/00* (2006.01)
(52) U.S. Cl.
  CPC ........ *B05B 14/45* (2018.02); *B04C 2009/004* (2013.01)
(58) Field of Classification Search
  CPC ... B04C 5/18; B04C 5/14; B05B 14/45; Y02P 70/10
  See application file for complete search history.

(56) References Cited

U.S. PATENT DOCUMENTS

| | | | | |
|---|---|---|---|---|
| 4,623,458 A * | 11/1986 | Hakola | ............ | B04C 5/14 55/435 |
| 4,735,639 A * | 4/1988 | Johnstone | ............ | B01D 46/06 55/315 |
| 4,956,090 A * | 9/1990 | Robinson | ............ | D21D 5/24 210/512.1 |
| 5,216,848 A * | 6/1993 | Abbott | ............ | B05B 15/63 451/75 |
| 5,575,979 A * | 11/1996 | Hanson | ............ | B01J 8/0055 422/132 |
| 6,080,217 A * | 6/2000 | Gobl | ............ | B04C 5/28 55/385.2 |
| 6,589,323 B1 * | 7/2003 | Korin | ............ | B01D 53/04 55/459.1 |
| 6,686,752 B1 * | 2/2004 | Heumann | ............ | B01D 45/12 55/435 |
| 11,224,891 B2 * | 1/2022 | Lutz | ............ | B05B 14/10 |
| 2002/0078883 A1 * | 6/2002 | Shutic | ............ | B01D 45/14 118/50 |
| 2002/0144651 A1 * | 10/2002 | Kuenen | ............ | A23P 20/12 118/308 |
| 2005/0022483 A1 * | 2/2005 | Shutic | ............ | B05B 16/25 55/315 |
| 2011/0000437 A1 * | 1/2011 | Meter | ............ | A01K 41/00 95/271 |
| 2011/0159596 A1 * | 6/2011 | Keinan | ............ | G01N 1/2211 422/86 |
| 2013/0017135 A1 * | 1/2013 | Anderson | ............ | B01D 53/8668 423/210 |
| 2015/0020732 A1 | 1/2015 | Hoversten et al. | | |
| 2017/0232132 A1 * | 8/2017 | Deane | ............ | F24F 8/192 422/121 |
| 2018/0353987 A1 * | 12/2018 | Shutic | ............ | B05B 14/48 |
| 2018/0369849 A1 * | 12/2018 | Loos | ............ | B05B 14/45 |
| 2019/0134650 A1 * | 5/2019 | Martindale | ............ | B01D 45/16 |
| 2020/0229666 A1 * | 7/2020 | Conrad | ............ | A47L 5/28 |
| 2021/0016298 A1 * | 1/2021 | Swintak | ............ | B01D 45/16 |
| 2022/0304287 A1 * | 9/2022 | van Kilsdonk | ............ | A01K 67/033 |
| 2023/0065169 A1 * | 3/2023 | Emilsson | ............ | B04C 11/00 |
| 2023/0278045 A1 * | 9/2023 | Elsaadawy | ............ | B04C 5/103 96/207 |

* cited by examiner

CYCLONE SEPARATOR PARTICULARLY FOR A POWDER RECOVERY DEVICE OF A POWDER COATING SYSTEM

CROSS-REFERENCE TO RELATED APPLICATION(S)

This application claims priority to German Application No. 10 2021 126 241.0 filed on Oct. 11, 2021, the disclosure of which is incorporated by reference herein in its entirety.

BACKGROUND

The present disclosure relates to a cyclone separator particularly for a powder recovery device of a powder coating system as well as a powder recovery device for a powder coating system, wherein the powder recovery device has at least one cyclone separator.

Cyclone separators are known in general from the field of emission control and serve for example in separating out solid particles contained in a mixed flow of powder and air. Unlike with a centrifuge, in a cyclone separator, the mixed flow to be treated is set into rotary motion by its own flow velocity and a structurally suitable separator design. The centrifugal forces acting on the powder particles of the mixed flow accelerate them radially outwardly and thereby separate them from the gas flow directed inwards in the cyclone separator and discharged.

A cyclone separator essentially consists of an inlet region, for example in the shape of a cylindrical container, whereby located beneath the inlet region is a separation region having a conical end region in which the centrifugal separation of at least a portion of the powder contained in the mixed flow occurs. The mixed powder/air flow is fed to the inlet region of the cyclone separator tangentially. Different inlet geometries are conceivable to that end such as, for example, a spiral inlet, a tangential inlet, a helical inlet or an axial inlet.

The inlet geometry creates a rotating flow of the mixed flow inside the cyclone separator. As a result of the turbulent flow that forms, and due to the centrifugal forces acting on them, the powder particles to be separated from the mixed flow settle on the outer wall of the separation region and are conveyed downward into a powder collecting region in spiral paths with the wall boundary layer flow along the cone formed at the lower end region of the separation region. The flow of gas is thereby forced to reverse upwards. The gas exits the cyclone separator in the form of a radial flow from the outside in and flows upward through a so-called immersion tube at the top of the cyclone separator. The immersion tube is an important component of the cyclone separator since its diameter determines the centrifugal force occurring in the cyclone separator and thus the separation efficiency as well as the pressure loss. The other dimensions of the cyclone separator's regions are adapted to the immersion tube.

Cyclone separator designs essentially differ by their inlet geometry. The most common inlet geometries are the spiral inlet and the tangential inlet, also called slot inlet. Since both are equivalent in terms of separation efficiency, preference is often given to the simpler tangential inlet. The axial inlet is sometimes required due to on-site space limitations. It is particularly suitable for large gas flow rates at somewhat lesser separation efficiency.

A cyclone separator of the above-cited type is known for example from printed publication DE 10 2007 005 312 A1. This known prior art cyclone separator serves in separating coating powder from a mixed air/powder flow. Thereby provided is for the powder separated in the separation region of the cyclone separator to be fed back to a powder spray coating system as recovery powder. Before the powder separated and thus recovered from the mixed powder/air flow can be reused as recovery powder in a powder coating system—either outright or mixed with fresh powder—the recovery powder may sometimes need to be treated so as to be of sufficiently good quality. This can also include sifting the recovery powder through a sieve in order to be able to separate coarse-grained impurities from the recovered coating powder.

The present disclosure is based on the problem of powder recovery devices of a powder coating system and in particular cyclone separators needing to be thoroughly cleaned whenever a powder is changed (changing from one type of powder to another type of powder), particularly when changing colors (changing from powder of a first color to powder of a second different color), since even just a few powder particles of the earlier type of powder can result in coating defects during coating with the new type of powder.

The task to be solved by the present disclosure is that of creating an opportunity which enables a simple and quick powder change.

SUMMARY

A cyclone separator is disclosed herein, particularly for a powder recovery device of a powder coating system. Also disclosed herein is a powder recovery device of a powder coating system that comprises at least one cyclone separator.

A cyclone separator according to the present disclosure in particular comprises an inlet region with an inlet for a mixed flow of powder/air, a separation region adjoining the lower end of the inlet region for the centrifugal separation of at least a portion of the powder contained in the mixed flow, and a powder collecting region which is or can be connected to the lower end region of the separation region so as to be able to collect the powder separated in the separation region.

In order to be able to easily yet effectively clean the cyclone separator upon a powder change, the present disclosure in particular provides for the powder collecting region to be able to be shifted relative to the separation region between a first position in which the powder collecting region is in particular aligned in flush connection with the lower end region of the separation region and a second position in which the powder collecting region is in particular not aligned in flush connection with the lower end region of the separation region and in which access to the interior of the separation region and/or inlet region of the cyclone separator is possible via the lower end region of the separation region.

In other words, a relatively large entrance is made available in the second position of the powder collecting region for a person wanting to clean the cyclone separator via which e.g. air blast bars can be introduced in order to blow off and accordingly clean the inner wall of the cyclone separator with compressed air.

The present disclosure additionally provides for the cyclone separator to further comprise an illuminating device having at least one light source, wherein the illuminating device is designed to illuminate or light up at least sections of the interior of the separation region and/or the inlet region of the cyclone separator as needed with the at least one light source, and that particularly when the powder collecting region is in its second position.

The advantages able to be achieved by providing such an illuminating device are clear. In particular, the illuminating device allows the interior area of the cyclone separator which is to be cleaned to be illuminated during the cleaning of the cyclone separator, which affords the operator of the cyclone separator an easy opportunity to check the cleanliness of the cyclone separator. The internal cleaning of the cyclone separator can thereby be accomplished considerably more efficiently, as powder change-induced downtime of the cyclone separator can be significantly reduced.

In order to be able to make cleaning the interior of the cyclone separator even more efficient, implementations of the disclosed cyclone separator provide for the illuminating device to be designed such that the at least one light source of the illuminating device switches on automatically and/or can be switched on manually when the powder collecting region is in its second position or shifted into its second position.

Alternatively or additionally thereto, it is provided for the illuminating device to be designed such that the at least one light source of the illuminating device switches off automatically and/or can be switched off manually when the powder collecting region is in its first position or, respectively, when the powder collecting region is shifted into its first position.

What the automatic switching on and off of the at least one light source of the illuminating device achieves is there being no need to manually activate or deactivate the illuminating device. The operator of the cyclone separator can thus concentrate fully on the cleaning procedure, which ultimately makes it more efficient.

In this context, it is conceivable for an appropriate switch to be arranged on the powder collecting region or allocated to the powder collecting region in order to detect whether the powder collecting region is in the first or second position or has been shifted into the first or second position respectively.

Different configurations are conceivable in realizing the illuminating device. For example, it is thus conceivable for the at least one light source of the illuminating device to be arranged outside of the separation region and outside of the inlet region of the cyclone separator. It is thereby in particular conceivable for the at least one light source of the illuminating device to be fixedly installed relative to the separation region and the inlet region of the cyclone separator. The at least one light source of the illuminating device can for example be arranged on a support frame of the cyclone separator or on the ground underneath the cyclone separator.

In this context, it makes sense for the at least one light source to be arranged and aligned relative to the separation region and the inlet region of the cyclone separator such that at least 50% and preferably at least 70% and even more preferentially at least 80% of the light emitted by the at least one light source of the illuminating device strikes an interior wall area of the separation region and/or the inlet region of the cyclone separator at least in the second position of the powder collecting region. This can for example be realized by means of an optical system allocated to the at least one light source of the illuminating device.

Alternatively or additionally to the latter configuration, it is conceivable for the at least one light source of the illuminating device or at least one light source of the illuminating device to be arranged within the separation region or the inlet region of the cyclone separator. Here as well, the at least one light source is to be arranged and aligned relative to the separation region and relative to the inlet region of the cyclone separator such that at least 50% and preferably at least 70% and even more preferentially at least 80% of the light emitted by the at least one light source of the illuminating device strikes an interior wall area of the separation region and/or the inlet region of the cyclone separator.

Different positionings, arrangements and alignments of the at least one light source of the illuminating device are of course also conceivable.

One specific configuration of the present disclosure provides for the illuminating device of the cyclone separator to be able to be shifted relative to the separation region of the cyclone separator between a first position, in which the at least one light source of the illuminating device can illuminate or light at least part or areas of the interior of the separation region and/or the interior of the inlet region of the cyclone separator via the lower end region of the separation region, and a second position in which the powder collecting region is in its first position and lighting or illuminating of at least part or areas of the interior of the separation region and/or the interior of the inlet region of the cyclone separator via the at least one light source is prevented.

Particularly able to be provided with this specific configuration of the illuminating device is its quasi-automatic transitioning into the cleaning operation of the cyclone separator in its first position; i.e. without any operator intervention. Said first position is in particular a position of the illuminating device in which the at least one light source of the illuminating device can illuminate the interior of the cyclone separator as optimally as possible. The most optimal illumination in particular means the fullest and most uniform illumination possible without any shadows being cast.

Because the illuminating device in the first position shines into the interior of the separation region and/or into the interior of the inlet region of the cyclone separator from below in this configuration, the direction of the light emitted by the at least one light source is aligned along the divergent wall sections of the cyclone separator, which ensures the most uniform and fullest interior illumination possible.

To achieve the illuminating device being able to be shifted into the first position preferably automatically, or at least in just a few steps, preferential implementations of the disclosed cyclone separator provide for the illuminating device to only be shiftable from its second position into its first position when the powder collecting region is in its first position. In other words, the illuminating device is blocked from shifting into its first position when the cyclone separator is not in cleaning mode; i.e. when the powder collecting region is (still) in its first position.

Alternatively or additionally thereto, it is conceivable for the illuminating device to be shifted from its second position into its first position automatically and/or independently or in automated fashion when the powder collecting region is shifted from its first position to its second position. It is for example thereby conceivable for the illuminating device to pivot into its first position at the same time as the powder collecting region executes a pivoting movement to pivot out of its first position into its second position.

It is likewise alternatively or additionally conceivable for the illuminating device to be automatically and/or independently or in automated fashion shifted from its first position, in which the at least one light source of the illuminating device illuminates or lights up the interior of the cyclone separator, into its second position when the powder collecting region is shifted from its second position (i.e. the "rest position" in the cleaning mode of the cyclone separator) into its first position.

Other coordinated and/or synchronized movements of the powder collecting region on the one hand and the illuminating device on the other are of course also conceivable.

Particularly useful in this context is coupling the movements of the powder collecting region and the illuminating device, e.g. via a coupling mechanism (such as a gear mechanism, for example), such that a movement of the powder collecting region relative to the separation region also moves the illuminating device in a synchronized and in particular coordinated manner.

Of course, however, other solutions are also conceivable, thus solutions which do not provide for any synchronized or coordinated coupled movement between the powder collecting region and the illuminating device. It is for example thereby conceivable for the illuminating device to be arranged on a cleaning device such as, for example, a frame of a cleaning lance or the like, and be automatically and/or independently or in automated fashion positioned underneath the outlet opening of the separation region when the cleaning device is positioned in or inside of the cyclone separator for cleaning.

Completely unguided movements of the illuminating device are in principle also conceivable, in which the operator of the cyclone separator temporarily positions the illuminating device at the inlet of the opened separation region, for example using a magnetic connection or a clamp connection. These solutions are certainly characterized by their simple structure although disadvantageous with these solutions is the operator of the cyclone separator needing to take additional steps in order to correspondingly affix the illuminating device. Nor do such manual solutions offer any guarantee that the most optimal possible illuminating or respectively lighting up of the interior of the cyclone separator in its first position will be provided by the illuminating device.

According to embodiments, the illuminating device is designed such that the at least one light source of the illuminating device can automatically and/or manually switch on when the illuminating device is shifted from its second position into its first position. Alternatively or additionally, the at least one light source of the illuminating device can automatically and/or manually switch off when the illuminating device is shifted from its first position into its second position.

An appropriate switch/sensor which is manually operable and/or activatable/deactivatable automatically, and in particular as a function of the position of the illuminating device and/or the powder collecting region, can be provided on the illuminating device for switching the at least one light source on or off.

It is also conceivable (alternatively or additionally to a switch/sensor on the illuminating device) for an appropriate switch/sensor to be externally provided on a cyclone separator control device or cyclone separator cleaning device, for example in the form of a touch button on a screen of the control device.

Provided according to one particularly preferential implementation of the disclosed cyclone separator is for the powder collecting region to be pivotable between its first position and its second position in a horizontal pivot plane relative to the separation region. In this configuration, it makes sense for the illuminating device to likewise be pivotable between its first position and its second position in a horizontal pivot plane relative to the separation region.

In order to achieve the at least one light source of the illuminating device being positioned as close as possible to the entrance to the interior of the separation region and/or the interior of the inlet region of the cyclone separator when the powder collecting region is in its second position, the horizontal pivot plane of the illuminating device should preferably coincide or at least substantially coincide with the horizontal pivot plane of the powder collecting region. Alternatively thereto, however, it is of course also conceivable that the two horizontal pivot planes do not coincide, although it is then however preferential for the horizontal pivot plane of the illuminating device to be at least in the immediate proximity of the horizontal pivot plane of the powder collecting region.

However, other solutions are naturally also conceivable, particularly when the at least one light source of the illuminating device comprises a special optical system for suitably focusing the light emitted by the at least one light source. It is then also particularly conceivable for the at least one light source to be located farther from the entrance to the interior of the separation region and/or the interior of the inlet region of the cyclone separator in the first position of the illuminating device.

Although not intended to limit the protective scope of the present disclosure, it is advantageous with respect to the easiest possible operability of the cyclone separator and in particular the illuminating device when the illuminating device cannot be arbitrarily positioned relative to the cyclone separator. This also has the advantage of the operator of the cyclone separator not needing to take heed of any predefined or definable preferential positions of the at least one light source relative to the interior of the cyclone separator when the illuminating device is shifting into its first position.

In consideration of these general concepts, variants of the disclosed cyclone separator provide for it to comprise a support frame via which the inlet region and/or separation region of the cyclone separator is/are at least partially supported. It then makes sense in this context for the powder collecting region to be pivotably mounted to the support frame via a joint assembly, in particular a first joint assembly, whereby the illuminating device is likewise pivotably mounted to the support frame via a joint assembly and preferably via a second joint assembly separate from the first joint assembly of the powder collecting region.

This is thereby a particularly easy to realize yet effective solution for the articulation of the powder collecting region on the one hand and the illuminating device on the other as it can be easily implemented by a corresponding hinge joint assembly. This solution variant is also particularly space-saving and only associated with minimal additional costs (if any). However, the present disclosure is of course not limited to this configuration.

In order to further simplify the operability of the cyclone separator and in particular effectively avoid any errors when setting the first position of the powder collecting region, one preferential configuration of the disclosed cyclone separator provides for it to comprise a limit stop in order to define at least the first position of the powder collecting region and to limit particularly a movement, in particular pivoting movement, of the powder collecting region relative to the separation region when the powder collecting region shifts from its second position into its first position. The same can also be alternatively or additionally provided for the second position of the powder collecting region via a correspondingly associated limit stop. It is thereto also alternatively or additionally conceivable to define at least one corresponding limit stop for defining the movement of the illuminating device either from the first into the second position or from the second into the first position.

Particularly with respect to the limit stop assigned to the cyclone separator, it is of advantage in this context for same to have a locating surface preferably at least partially formed from an elastomer and/or magnetized material and held particularly by a bar-shaped mount. It thereby makes sense for the illuminating device to further comprise an in particular bar-shaped mount, whereby the at least one light source is provided at a first end region of the in particular bar-shaped mount of the illuminating device. Preferably provided in this implementation of the disclosed cyclone separator is for a hinge joint connected to the in particular bar-shaped mount of the limit stop to be formed in a second end region of the in particular bar-shaped mount of the illuminating device.

This thereby relates to a feasible and especially particularly easily realizable implementation of the cyclone separator according to the present disclosure, although alternative configurations are of course conceivable.

In particular provided according to one implementation of the latter embodiment of the cyclone separator is for an edge protector to be formed on the first end region of the in particular bar-shaped mount of the illuminating device, wherein the rotational axis of the hinge joint lies in particular on an outer edge of the in particular bar-shaped mount of the limit stop.

This design variant has the advantage of being able to use a particularly easily implemented measure; i.e. a suitable hinge joint, in order to realize the possible paths of motion of the illuminating device on the one hand and the powder collecting region on the other.

Embodiments of the disclosed cyclone separator provide for at least the lower end regions of the separation region to be frustoconical with a shell geometry that tapers, in particular conically tapers, toward the powder collecting region, wherein the powder collecting region is provided with a shell geometry which tapers in particular conically toward a powder outlet at the lower end region of the powder collecting region. In the first position of the powder collecting region, it is thereby preferably pneumatically movable in the longitudinal direction of the cyclone separator preferably relative to the separation region of the cyclone separator such that an outlet opening of the separation region can be (appropriately) connected to an inlet opening of the powder collecting region. Of course, instead of a pneumatic movement of the powder collecting region in the longitudinal direction of the cyclone separator relative to the separation region, a hydraulic, electrical or manual movement is also conceivable.

Implementations of the disclosed cyclone separator provide for it to comprise a sieve held in a sieve housing of particularly at least partly cylindrical design which is inserted or insertable between the lower end region of the separation region and the powder collecting region such that the opening at the upper end of the in particular cylindrical sieve housing coincides with the outlet opening at the lower end region of the separation region and the opening at the lower end of the in particular cylindrical sieve housing coincides with the inlet opening at the upper end of the powder collecting region.

Using a sieve integrated or integrable into the cyclone separator has the advantage of already being able to separate coarse-grained impurities from the powder settling in the separation region within the separation region itself so that the powder can be directly reused in a powder coating system, e.g. as recovery powder, without the provision of additional sifting devices upstream or downstream of the cyclone separator. This allows the realizing of a particularly compact powder recovery device, one which is characterized by its simple design and its small space requirements.

Moreover to be considered is that it is substantially easier and faster to perform the required cleaning of a sieve provided within the cyclone separator, e.g. when changing powder, without the risk of thereby contaminating the environment with powder.

It is thus for example conceivable for the sieve to pivot in and out between the lower end region of the separation region and the powder collecting region in a preferably horizontal pivoting motion. The operator of the cyclone separator can easily reach the sieve, for example for cleaning purposes, when it is only partially pivoted out, whereby any powder material falling from the sieve during cleaning is suctioned in by the flow set in the cyclone separator and thus cannot escape.

The specific positioning of the sieve between the lower end region of the separation region and the powder collecting region furthermore ensures that the sieve lies in a horizontal plane directly at the reversal point of the main flow which forms inside the cyclone separator during operation. Although it is in principle conceivable for the sieve to lie in a horizontal plane running through the reversal point, it is preferential in terms of the sifting process efficiency for the sieve to be arranged slightly above the reversal point so that the axial velocity components of the main flow within the cyclone separator directed toward the powder collecting region can be utilized with respect to the passage of the powder particles through the bottom of the sieve or the sieve mesh respectively.

Of course, however, it is also conceivable for the sieve to be arranged in a horizontal plane which runs through the reversal point of the main flow forming within the cyclone separator during operation.

It is also conceivable for the sieve to be located below the reversal point. This is then in particular possible when the sieve for example has a relatively large mesh size compared to the powder particle size so that a propelling force in the form of the axial velocity component of the main flow directed in the direction of the powder collecting region can be dispensed with in the sifting process; i.e. the passage of the powder particles through the sieve bottom or sieve mesh respectively.

It is advantageous for the sieve to be arranged in or near (above or below) the reversal point of the main flow so that mechanical strain on the mesh surface caused by friction and generated by the powder particles contained in the mixed flow, and thus mesh surface abrasion and material loss, can be reduced.

The reversal point of the main flow forming inside the cyclone separator during operation which is characteristic for the positioning of the sieve is determined by the natural vortex length. In a cyclone separator having a separation region with a frustoconical lower end region, the vortex which forms inside the cyclone separator during operation ends approximately at a point corresponding to the intersection of the surface lines of the frustoconical lower end region.

To be considered here is that the peripheral velocity of the main flow at the reversal point has the value of 0, or respectively is considerably reduced compared to the peripheral flow above the reversal point. Having the sieve being preferably arranged in or directly on the reversal point of the main flow can effectively reduce the mechanical strain on the mesh surface caused by friction and generated by the powder particles contained in the mixed flow and thus mesh surface abrasion and material loss.

This embodiment of the disclosed cyclone separator is therefore also in particular characterized by less frequent maintenance work, and thus cyclone separator downtimes, being necessary compared to conventional cyclone separators.

According to implementations of the disclosed cyclone separator, the in particular cylindrical sieve housing is pivotable between the lower end region of the separation region and the powder collecting region of the cyclone separator by means of a preferably horizontal pivoting motion.

It is in principle advantageous for a fluidizing device to be provided for fluidizing powder collected as recovery powder in the powder collecting region of the cyclone separator.

It is for example conceivable in this context for the fluidizing device to comprise at least one fluidizing wall between a wall of the powder collecting region and a fluidizing compressed air channel, wherein the fluidizing wall exhibits a plurality of open pores or holes which are so small as to be permeable to fluidizing air yet impermeable to powder particles of the recovery powder.

It is thereby advantageous with respect to a particularly compact configuration of the disclosed cyclone separator for the at least one fluidizing wall to preferably form at least one section of a wall forming the powder collecting region of the cyclone separator.

The powder collecting region is to preferably have a powder outlet at its lower end so as to be able to discharge the powder collected in the powder collecting region. It particularly makes sense in this context for the powder outlet to be provided with a powder outlet valve so that the powder separated within the separation region can be stored in the powder collecting region as recovery powder when the powder outlet valve is closed. The powder outlet valve is preferably realized as a pinch valve.

Particularly according to further developments of the latter embodiments is the providing of the powder collecting region with at least one sensor in order to be able to detect at least one predetermined powder level in the powder collecting region, whereby a mechanism for generating mechanical vibrations in the powder collecting region is preferably provided for preventing powder from adhering to the wall area of the powder collecting region and for ensuring the most accurate possible powder level detections with the at least one sensor.

The present disclosure further relates to a powder recovery device for a powder coating system, wherein the powder recovery device comprises a cyclone separator of the above-described type which has a powder outlet with a powder outlet valve at the lower end of the powder collecting region for discharging the powder collected in the powder collecting region. A powder pump is furthermore preferably provided in a powder outlet path downstream of the powder outlet valve to convey the powder collected as recovery powder out of the powder collecting region.

BRIEF DESCRIPTION OF THE DRAWINGS

The following will reference the accompanying drawings in describing an exemplary embodiment of the disclosed cyclone separator in greater detail.

Shown are.

DETAILED DESCRIPTION

Figure 1:
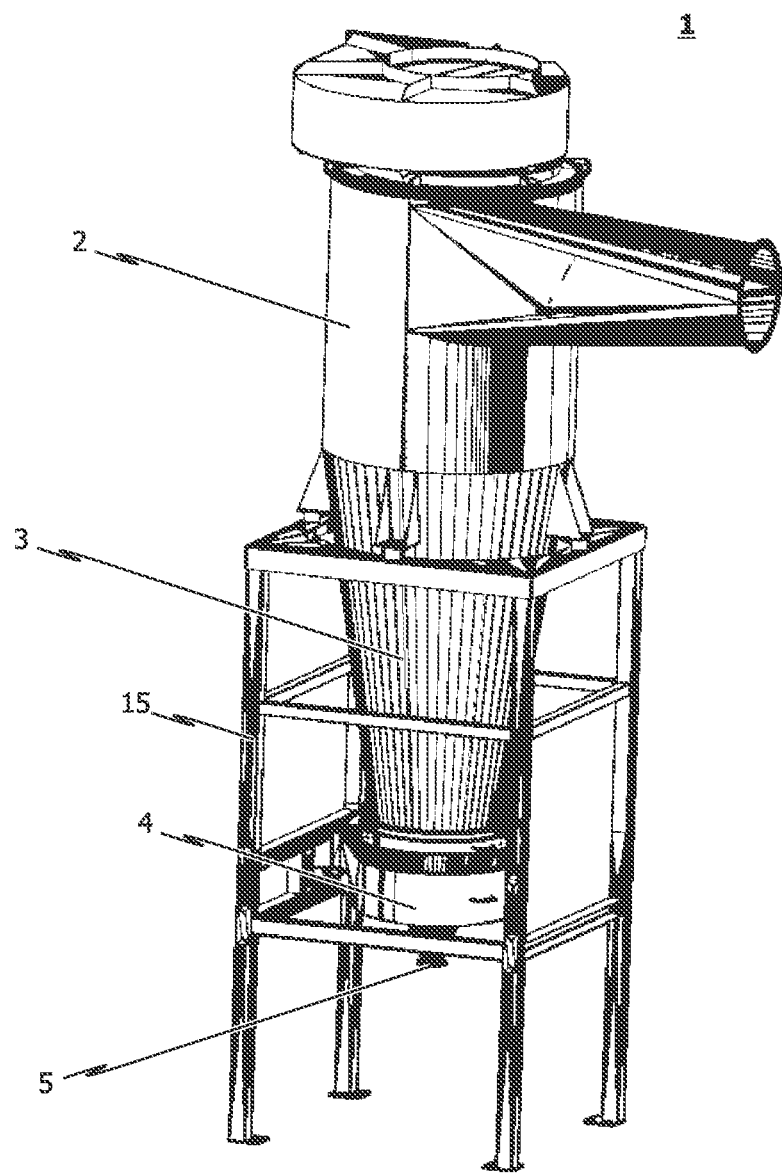
FIG. 1: a schematic and isometric view of an exemplary embodiment of the cyclone separator according to the present disclosure, wherein the powder collecting region of the cyclone separator is in its first position.

The exemplary embodiment of the cyclone separator 1 shown in the drawings is particularly suitable for use in a powder spraying coating system for the spray coating of objects with coating powder which is then fused onto the object in a heating furnace.

Known for the purpose of recovering excess powder, thus powder sprayed past the object to be coated or which falls from the object, is fluidically connecting a powder separator particularly in the form of a cyclone separator 1 to the interior of the coating booth via an extraction port. A suction fan, which is attached for example to an air outlet of the cyclone separator 1 sucks at least most of the excess powder and air from the interior of the coating booth through the cyclone separator 1, wherein the powder/air flow is separated into air and powder in the cyclone separator 1 by cyclonic centrifugal force. The separated powder falls into a powder collecting region 4 or collection chamber under the cyclone separator 1 while the air cleaned of powder is usually blown into the external atmosphere through an after-filter. The cyclone separator 1 usually requires such an after-filter because it is unable to separate fine powder particles from the air flow as completely as a filter system can.

The powder/air mixture to be treated is brought into the cyclone separator 1 through a duct and in particular a tangential air inlet. The powder/air mixture is then set into a rotating motion, the powder being separated from the air and deposited along the cyclone wall by the resulting centrifugal force. The exhaust air rises up through a central immersion tube in the cyclone separator 1 and then reaches a downstream filter separator (not shown in the drawings). The remaining residual powder is held back at this point and the cleaned air returned back into the external atmosphere again.

In detail, the cyclone separator 1 thus comprises an inlet region 2 with an inlet for the mixed powder/air flow, an adjoining separation region 3 at the lower end region of the inlet region 2 for the centrifugal separation of at least a portion of the powder contained in the mixed flow, and a powder collecting region 4 connected or connectable to the lower end region of the separation region 3 for collecting the powder separated in the separation region 3.

According to the embodiment of the cyclone separator 1 depicted in the drawings, at least the lower end region of the separation region 3 is frusto-conical with an in particular conical shell geometry tapering toward the powder collecting region 4. The upper end region of the separation region 3 can also be slightly tapered or even cylindrical. The already cited likewise cylindrical inlet region 2 with the powder inlet adjoins at the upper end of the separation region 3. An airflow outlet formed by the upstream end of a drain line or to which the drain line can be attached is located in the radial center of the inlet region 2.

The powder collecting region 4 is connected or connectable to the lower end region of the separation region 3 for collecting the powder separated in the separation region 3.

The powder collecting region 4 exhibits an in particular conically tapered shell geometry toward the powder outlet 5 provided at the lower end of the powder collecting region 4 so that the recovery powder collected in the powder collecting region 4 falls toward the powder outlet 5 under the force of gravity. The powder outlet 5 is provided with a powder outlet valve, preferably a pinch valve, by means of which the powder outlet 5 can be alternatingly opened or closed.

A fluidizing device can be arranged in the lower part of the powder collecting region 4 for fluidizing the recovery powder in the powder collecting region 4. The fluidizing device can extend into the powder collecting region 4 or preferably be designed such that the fluidizing wall of the fluidizing device forms at least a section of the powder collecting region 4 wall.

The term "fluidizing" here means that the fluidizing compressed air flows through the recovery powder and thereby puts the recovery powder into a flowable (fluidized) state or improves the fluidity of the recovery powder.

The powder collecting region 4 can be further provided with at least one sensor. This can be a level sensor or a switch which generates a signal and does so as a function of whether the recovery powder within the powder collecting region 4 has or has not reached at least the powder level detected by the sensor. For example, the sensor is arranged at a certain distance above the powder outlet valve and can be used to define a predetermined reserve quantity of recovery powder.

It is preferential for a device which generates mechanical vibrations to be provided in the powder collecting region 4 so as to subject the powder collecting region 4 to a mechanical vibration when needed to thereby loosen any powder material that may have deposited on the sensor.

The powder outlet valve configured in particular as a pinch valve is preferably only opened when recovery powder is withdrawn from the powder collecting region 4 as the powder outlet valve preferably always remains closed whenever no powder is being withdrawn from the cyclone separator 1 or the powder collecting region 4 respectively. This thus prevents air from getting into the cyclone separator 1 and disrupting the centrifugal separation.

Although not depicted in the drawings, it is preferential for a powder recovery line to be attached at the outlet side of the powder outlet valve. A powder pump is preferably disposed in the powder recovery line, or even more preferentially at its upstream or its downstream end, for conveying recovery powder from the powder collection area 4 to an intermediate container of the powder recovery device or powder coating system respectively.

Advantageous in this context is for the powder pump to then only be switched on by a control unit when the powder outlet valve is also opened by the control unit. Depending on the type of powder pump, this prevents it from sucking compressed air out of the cyclone separator 1 or pumping it into the cyclone separator 1 and thereby disrupting the function of the cyclone separator 1.

Figure 6:
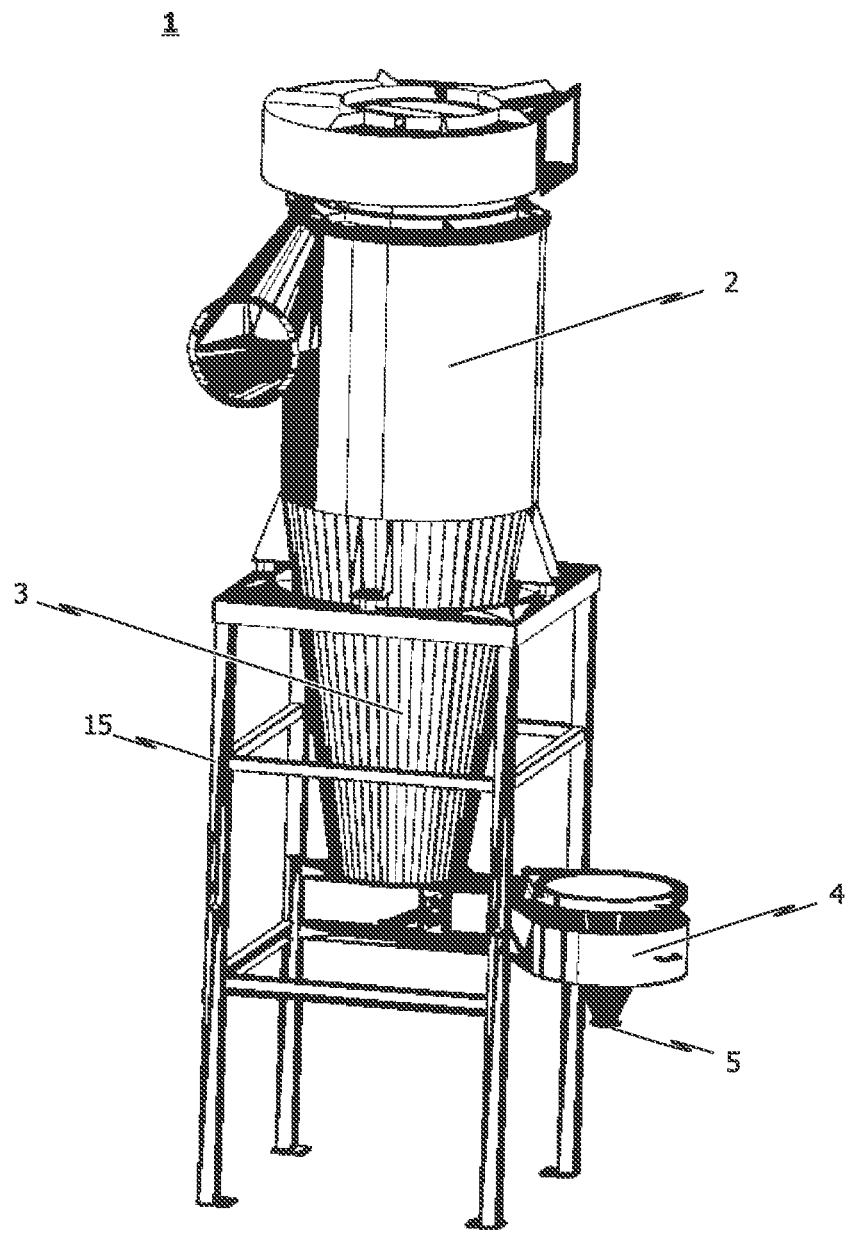
FIG. 6: a schematic and isometric view of the exemplary embodiment of the disclosed cyclone separator, wherein the powder collecting region is in its second position.

As it can be noted in particular from the FIG. 6 illustration, the powder collecting region 4 of the cyclone separator 1 can be shifted relative to the separation region 3 between a first position (see FIG. 1), in which the powder collecting region 4 is in particular aligned in flush connection with the lower end region of the separation region 3, and a second position (see FIG. 6) in which the powder collecting region 4 is in particular not aligned in flush connection with the lower end region of the separation region 3 and in which access to the interior of the separation region 3 and/or inlet region 2 of the cyclone separator 1 is thus possible via the lower end region of the separation region 3.

To that end, the powder collecting region 4 is pivotable in a horizontal pivot plane relative to the separation region 3 between the first position (FIG. 1) and the second position (FIG. 6).

As depicted, not only is the lower end region of the separation region 3 of frustoconical design with a shell geometry that tapers, in particular conically tapers, toward the powder collecting region 4 but so is the powder collecting region 4 with its shell geometry conically tapering toward the powder outlet 5 located at the lower end region of the powder collecting region 4.

In the first position of the powder collecting region 4 as shown in FIG. 1, same is movable relative to the separation region 3 in the longitudinal direction of the cyclone separator 1, preferably pneumatically, hydraulically, electrically or manually, such that an outlet opening of the separation region 3 can be connected to an inlet opening of the powder collecting region 4.

Preferably, the cyclone separator 1 comprises a sieve held in an in particular at least partly cylindrical sieve housing which is inserted or insertable between the lower end region of the separation region 3 and the powder collecting region 4 such that the opening at the upper end of the in particular cylindrical sieve housing coincides with the outlet opening at the lower end region of the separation region 3 and the opening at the lower end of the in particular cylindrical sieve housing coincides with the inlet opening at the upper end of the powder collecting region 4. The in particular cylindrical sieve housing is preferably pivotable between the lower end region of the separation region 3 and the powder collecting region 4 in particularly a horizontal pivoting motion.

The exemplary embodiment of the cyclone separator 1 according to the present disclosure is in particular characterized by the cyclone separator 1 further comprising an illuminating device 6 having at least one light source 7, particularly in the form of an LED with a suitable optical system. The illuminating device 6 is thereby able to be shifted relative to the separation region 3 between a first position, in which the at least one light source 7 can illuminate or light at least part or areas of the interior of the separation region 3 and/or the interior of the inlet region 2 of the cyclone separator 1 via the lower end region of the separation region 3, and a second position in which the powder collecting region 4 is in its first position and a lighting or illuminating of at least part or areas of the interior of the separation region 3 and/or the interior of the inlet region 2 of the cyclone separator 1 via the at least one light source 7 is prevented.

Figure 7:
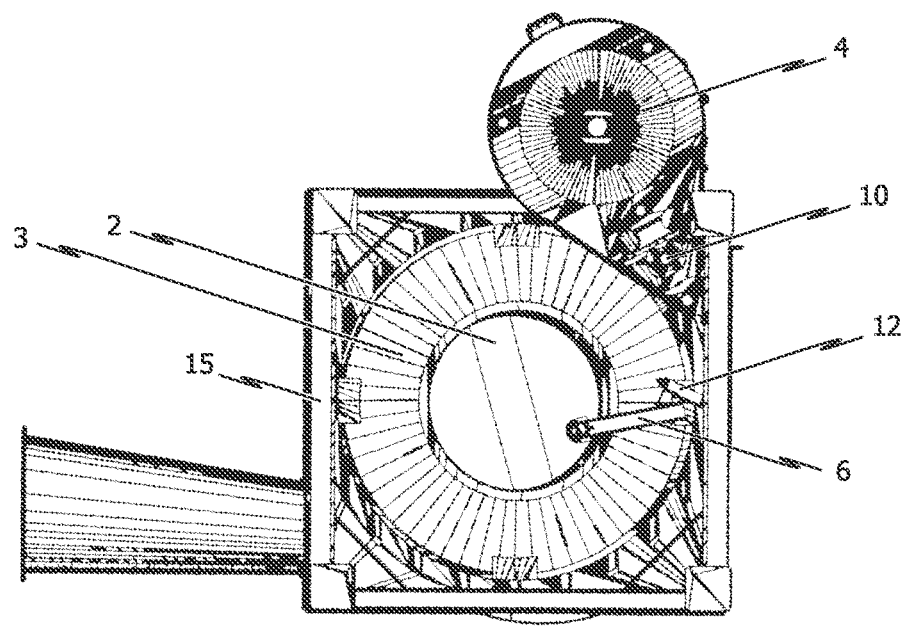
FIG. 7: a schematic view from below of the exemplary embodiment of the disclosed cyclone separator according to FIG. 8.
Figure 8:
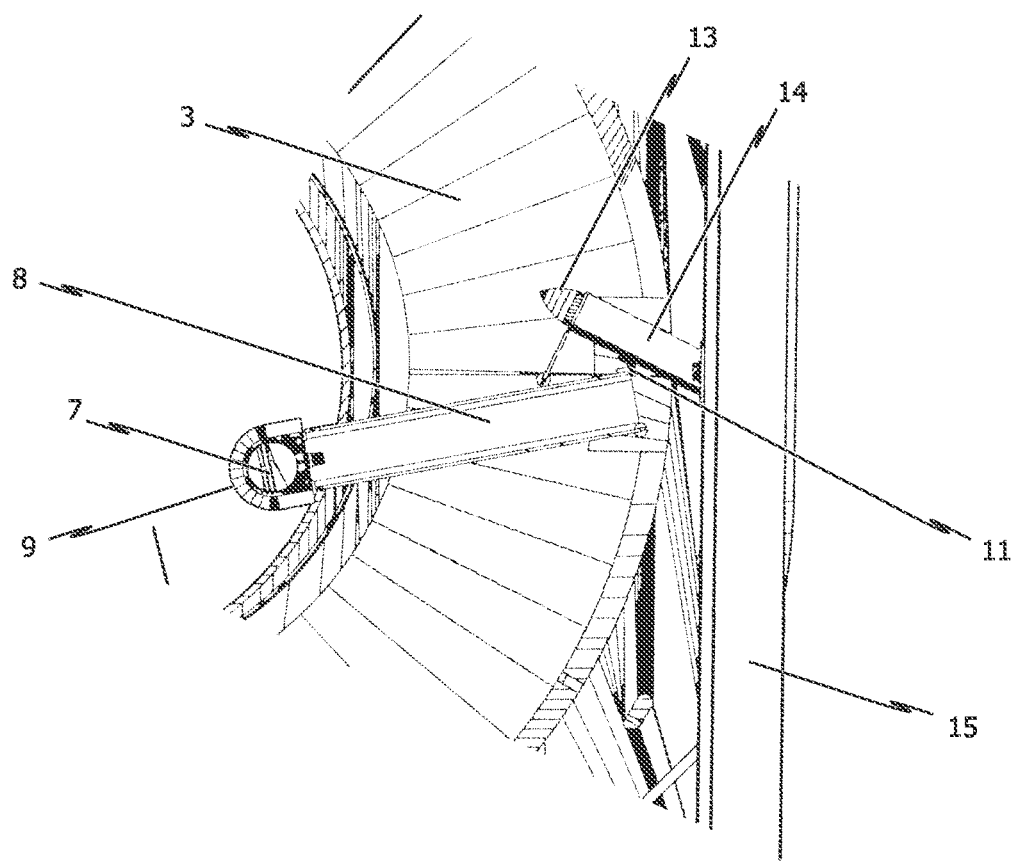
FIG. 8: a schematic detail view of FIG. 7 with regard to the illuminating device used therein.

The illuminating device 6 of the exemplary embodiment of the cyclone separator 1 is in its first position in FIGS. 1 to 5, whereas the illuminating device 6 is in its second position in FIGS. 6 to 8.

The illuminating device 6 is preferably designed such that the illuminating device 6 can only be shifted from its second position (see in particular FIG. 5) into its first position (see in particular FIG. 8) when the powder collecting region 4 is in its first position.

Alternatively or additionally thereto, the illuminating device 6 is in particular designed such that the illuminating device 6 automatically, i.e. independently, shifts from its first position into its second position when the powder collecting region 4 is shifted from its second position into its first position.

As with the powder collecting region 4 of the cyclone separator 1, the illuminating device 6 is also pivotable between its first position and its second position in a horizontal pivot plane relative to the separation region 3. The horizontal pivot plane of the illuminating device 6 thereby preferably coincides with the horizontal pivot plane of the powder collecting region 4 or is preferably at least in the immediate proximity of the horizontal pivot plane of the powder collecting region 4.

Able to be noted from the FIG. 1 and FIG. 6 illustrations is that the exemplary embodiment of the cyclone separator 1 comprises a support frame 15 via which the inlet region 2 and the separation region 3 of the cyclone separator 1 are at least partially supported.

Figure 2:
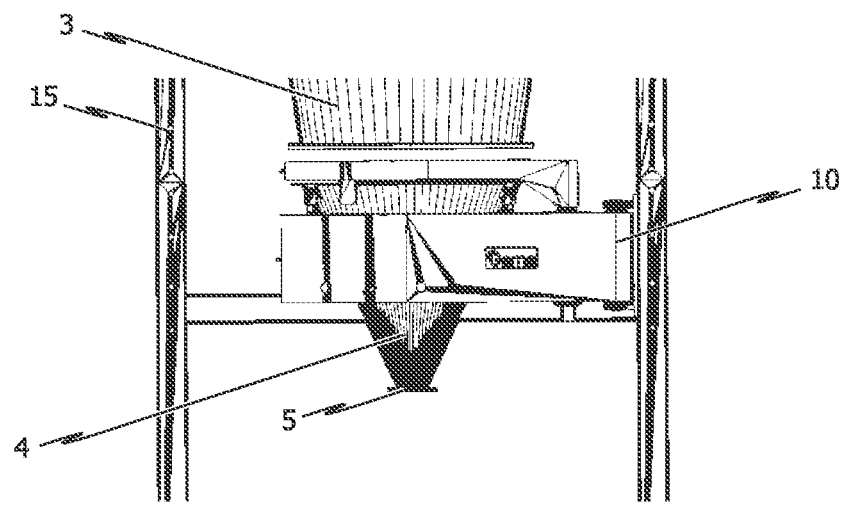
FIG. 2: a schematic and side view of the powder collecting region of the exemplary embodiment of the disclosed cyclone separator according to FIG. 1.
Figure 3:
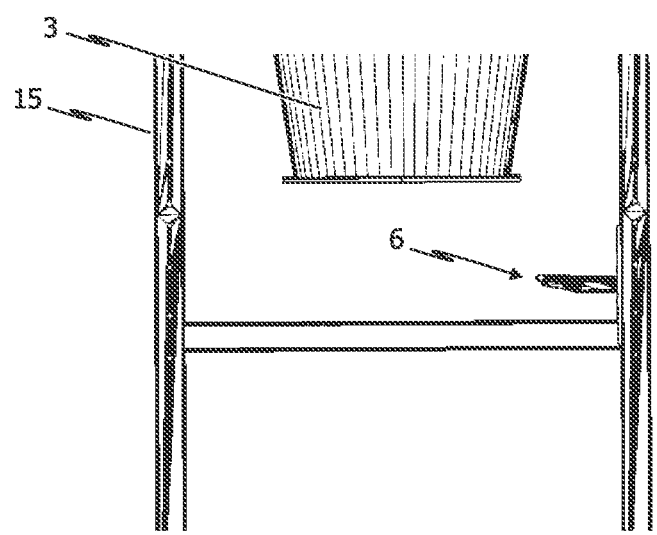
FIG. 3: a schematic and side view of the lower end region of the separation region of the exemplary embodiment of the disclosed cyclone separator according to FIG. 1 without the powder collecting region.
Figure 4:
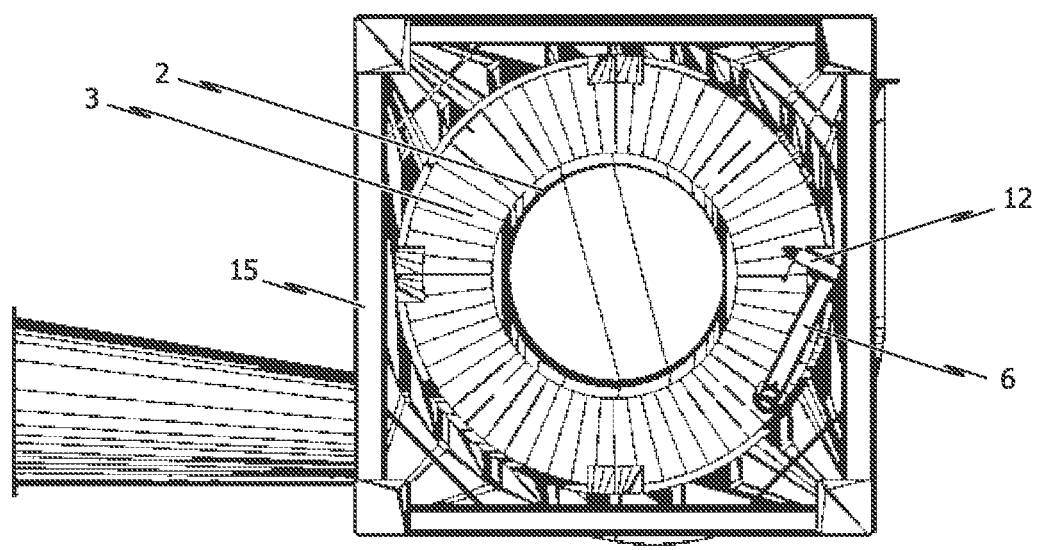
FIG. 4: a schematic plan view from below of the exemplary embodiment of the disclosed cyclone separator according to FIG. 3.

As can be further noted, for example from the FIG. 2 side view, is the powder collecting region 4 being pivotably mounted to the support frame 15 via a joint assembly 10.

Figure 5:
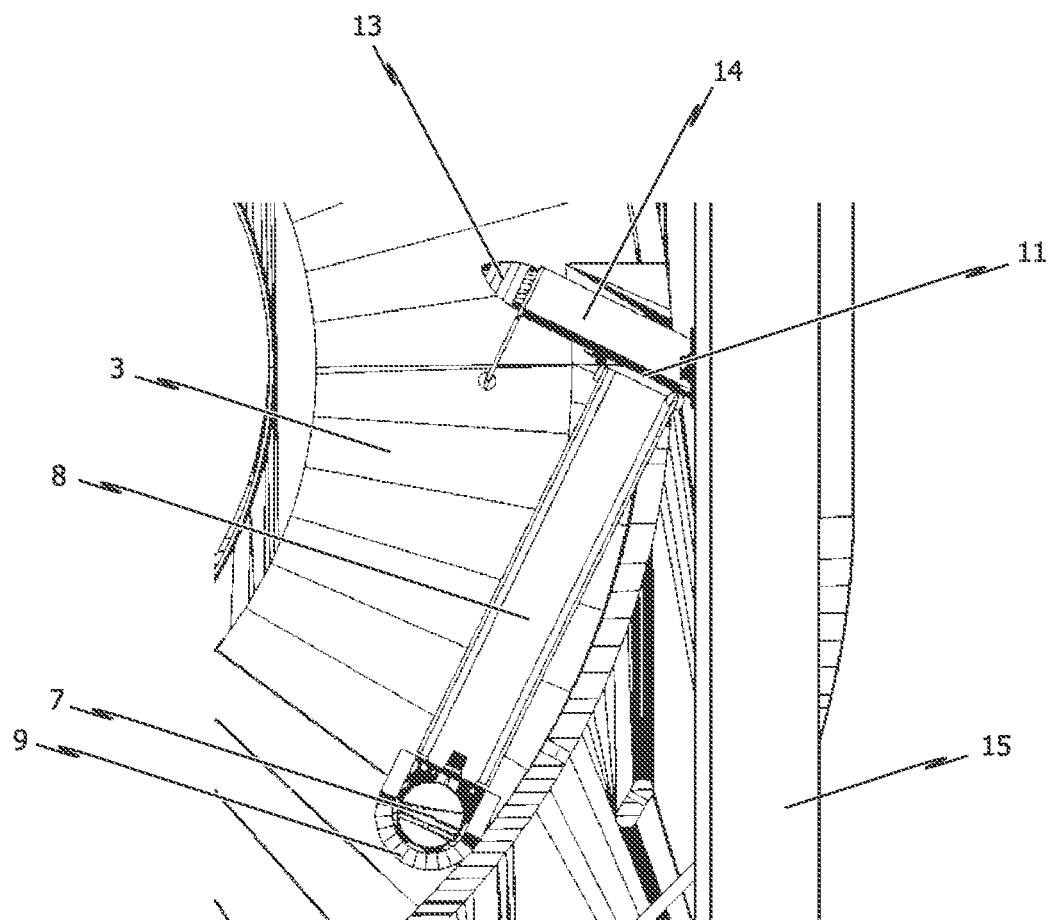
FIG. 5: a schematic detail view of FIG. 4 with regard to the illuminating device used therein.

Able to be noted particularly from the FIG. 5 and FIG. 8 detail views is that the illuminating device 6 is also pivotably mounted to the support frame 15 via a second joint assembly 11 which is separate from the first joint assembly 10 of the powder collecting region 4.

The detail views in FIG. 5 and FIG. 8 further show that the cyclone separator 1 has at least one limit stop 12 for defining a first position of the powder collecting region 4 and limiting particularly a movement, in particular pivoting movement, of the powder collecting region 4 relative to the separation region 3 when the powder collecting region 4 shifts from its second position into its first position.

The limit stop 12 preferably has a locating surface 13 formed at least in part from an elastomer. Alternatively or additionally thereto, it is also conceivable for the locating surface 13 of the limit stop 12 to be formed from a magnetized material so that the powder collecting region 4 is fixed when in the first position.

In the exemplary embodiment shown in the drawings, the locating surface 13 is held by an in particular bar-shaped mount 14 of the limit stop 12.

On the other hand, the illuminating device 6 likewise has an in particular bar-shaped mount 8, whereby the at least one light source 7 is provided at a first end region of the in particular bar-shaped mount 8 of the illuminating device 6. A hinge joint 11 connected to the in particular bar-shaped mount 14 of the limit stop 12 is formed on the opposite second end region of the in particular bar-shaped mount 8 of the illuminating device 6.

Lastly to be noted in the FIG. 5 and FIG. 8 detail views is that an edge protector 9 is formed on the first end region of the in particular bar-shaped mount 8 of the illuminating device 6.

The illuminating device 6 enables the interior of the cyclone separator 1 to be illuminated, particularly for the purpose of inspection or cleaning.

The at least one light source 7 of the illuminating device 6 preferably switches on automatically when the illuminating device 6 shifts from its second position into its first position. Of course, the switching on and off can also be done manually.

The implementation of the illuminating device 6 shown in the drawings provides good illumination of the interior of the cyclone separator 1 without any shadows being cast while at the same time access is still provided to the separation region 3 in the second position of the powder collecting region 4.

The present disclosure is not limited to the embodiment of the cyclone separator 1 depicted in the drawings but rather yields from an integrated overall consideration of all the features as disclosed herein. In particular, it is not absolutely necessary according to the present disclosure for the illuminating device 6 to be movable relative to the separation region 3 between a first position and a second position. All that is essential is for the illuminating device 6 be designed to illuminate or light up at least portions of the interior of the separation region 3 and/or the inlet region 2 of the cyclone separator 1 by means of the at least one light source 7 when needed, and to do so particularly (albeit not necessarily exclusively) when the powder collecting region 4 is in its second position.

In conjunction thereto, it is in particular also conceivable for the illuminating device 6 to be designed such that the at least one light source 7 of the illuminating device 6 switches on automatically when the powder collecting region 4 is in its second position or when the powder collecting region 4 is shifted into its second position respectively.

Similarly conceivable is for the at least one light source 7 of the illuminating device 6 to automatically switch off when the powder collecting region 4 is in its first position or when the powder collecting region 4 is shifted into its first position respectively.

As already indicated in the general part of the description, the at least one light source 7 of the illuminating device 6 can be arranged externally of the separation region 3 and the inlet region 2 of the cyclone separator 1 as shown in the exemplary embodiment in the drawings. Alternatively to the embodiment shown in the drawings, however, the at least one light source 7 of the illuminating device 6 can also be fixedly installed relative to the separation region 3 and relative to the inlet region 2 of the cyclone separator 1.

Alternatively or additionally thereto, it is also conceivable for at least one light source 7 of the illuminating device 6 to be arranged within the separation region 3 or the inlet region 2 of the cyclone separator 1.

LIST OF REFERENCE NUMERALS

1 cyclone separator
2 inlet region
3 separation region
4 powder collecting region
5 powder outlet
6 illuminating device
7 light source
8 bar-shaped mount of illuminating device
9 illuminating device edge protector
10 first joint assembly
11 second joint assembly/hinge joint
12 limit stop
13 locating surface
14 bar-shaped mount of limit stop
15 support frame

The invention claimed is:

1. A cyclone separator for a powder recovery device of a powder coating system, wherein the cyclone separator comprises:
  an inlet region with an inlet for a mixed flow of powder and air;

a separation region adjoining a lower end region of the inlet region for the centrifugal separation of at least a portion of the powder contained in the mixed flow; and
a powder collecting region connected or connectable to a lower end region of the separation region for collecting the powder separated in the separation region,
wherein the powder collecting region is shiftable relative to the separation region between a first position in which the powder collecting region is aligned in flush connection with the lower end region of the separation region and a second position in which the powder collecting region is not aligned in flush connection with the lower end region of the separation region and in which access to an interior of the separation region and/or inlet region of the cyclone separator is possible via the lower end region of the separation region, wherein the cyclone separator further comprises an illuminating device with at least one light source, wherein the illuminating device is designed to illuminate or light up at least sections of the interior of the separation region and/or the inlet region of the cyclone separator with the at least one light source when the powder collecting region is in its second position,
wherein the at least one light source of the illuminating device is arranged outside of the separation region and the inlet region of the cyclone separator,
wherein the illuminating device is designed such that:
the at least one light source of the illuminating device switches on automatically and/or can be switched on manually when the powder collecting region is in its second position and/or when the powder collecting region shifts into its second position,
wherein the cyclone separator comprises a limit stop for defining the first position of the powder collecting region and limiting a pivoting movement of the powder collecting region relative to the separation region when the powder collecting region shifts from its second position into its first position, and
wherein the limit stop has a locating surface at least partially formed from an elastomer and/or magnetized material which is held by a bar-shaped mount thereof, wherein the illuminating device has a bar-shaped mount, wherein the at least one light source is provided at a first end region of the bar-shaped mount of the illuminating device, and wherein a hinge joint connected to the bar-shaped mount of the limit stop is formed on a second end region of the bar-shaped mount of the illuminating device.

2. The cyclone separator according to claim 1, wherein the illuminating device is designed such that:
the at least one light source of the illuminating device switches off automatically and/or can be switched off manually when the powder collecting region is in its first position and/or when the powder collecting region shifts into its first position.

3. The cyclone separator according to claim 1,
wherein the at least one light source is arranged and aligned relative to the separation region and the inlet region of the cyclone separator such that at least 50% of the light emitted by the at least one light source of the illuminating device strikes an interior wall area of the separation region and/or the inlet region of the cyclone separator in the second position of the powder collecting region.

4. The cyclone separator according to claim 1,
wherein the illuminating device is shiftable relative to the separation region between a first position, in which the at least one light source can illuminate or light up at least part or areas of the interior of the separation region and/or inlet region of the cyclone separator via the lower end region of the separation region, and a second position in which the powder collecting region is in its first position and lighting or illuminating of at least part or areas of the interior of the separation region and/or inlet region of the cyclone separator via the at least one light source is prevented.

5. The cyclone separator according to claim 4,
wherein the illuminating device is designed such that:
(i) the illuminating device is only shiftable from its second position into its first position when the powder collecting region is in its first position; and/or
(ii) the illuminating device independently shifts from its first position to its second position when the powder collecting region is shifted from its second position to its first position; and/or
(iii) the at least one light source of the illuminating device is automatically switched on and/or can be manually switched on when the illuminating device shifts from its second position to its first position; and/or
(iv) the at least one light source of the illuminating device is automatically switched off and/or can be manually switched off when the illuminating device shifts from its first position into its second position.

6. The cyclone separator according to claim 4,
wherein the powder collecting region is pivotable between its first position and its second position in a horizontal pivot plane relative to the separation region, and wherein the illuminating device is pivotable between its first position and its second position in a horizontal pivot plane relative to the separation region, wherein the horizontal pivot plane of the illuminating device coincides with the horizontal pivot plane of the powder collecting region or is in immediate proximity to the horizontal pivot plane of the powder collecting region.

7. The cyclone separator according to claim 1,
wherein the cyclone separator comprises a support frame via which the inlet region and/or separation region of the cyclone separator is/are at least partially supported, wherein the powder collecting region is pivotably mounted to the support frame via a first joint assembly, and wherein the illuminating device is pivotably mounted to the support frame via a second joint assembly separate from the first joint assembly.

8. The cyclone separator according to claim 1,
wherein an edge protector is formed on the first end region of the bar-shaped mount of the illuminating device, and wherein the rotational axis of the hinge joint lies on an outer edge of the bar-shaped mount of the limit stop.

9. The cyclone separator according to claim 1,
wherein at least the lower end region of the separation region is frustoconical with a shell geometry that conically tapers toward the powder collecting region, wherein the powder collecting region is provided with a shell geometry which tapers conically toward a powder outlet at the lower end region of the powder collecting region, wherein in the first position of the powder collecting region, the powder collecting region is pneumatically, hydraulically, electrically or manually movable in a longitudinal direction of the cyclone separator relative to the separation region such that an outlet opening of the separation region is connectable to an inlet opening of the powder collecting region.

10. A cyclone separator for a powder recovery device of a powder coating system, wherein the cyclone separator comprises:

an inlet region with an inlet for a mixed flow of powder and air;

a separation region adjoining a lower end region of the inlet region for the centrifugal separation of at least a portion of the powder contained in the mixed flow; and a powder collecting region connected or connectable to a lower end region of the separation region for collecting the powder separated in the separation region, wherein the powder collecting region is shiftable relative to the separation region between a first position in which the powder collecting region is aligned in flush connection with the lower end region of the separation region and a second position in which the powder collecting region is not aligned in flush connection with the lower end region of the separation region and in which access to an interior of the separation region and/or inlet region of the cyclone separator is possible via the lower end region of the separation region, wherein the cyclone separator further comprises an illuminating device with at least one light source, wherein the illuminating device is designed to illuminate or light up at least sections of the interior of the separation region and/or the inlet region of the cyclone separator with the at least one light source when the powder collecting region is in its second position, wherein the cyclone separator comprises a limit stop for defining the first position of the powder collecting region and limiting a pivoting movement of the powder collecting region relative to the separation region when the powder collecting region shifts from its second position into its first position, and wherein the limit stop has a locating surface at least partially formed from an elastomer and/or magnetized material which is held by a bar-shaped mount thereof, wherein the illuminating device has a bar-shaped mount, wherein the at least one light source is provided at a first end region of the bar-shaped mount of the illuminating device, and wherein a hinge joint connected to the bar-shaped mount of the limit stop is formed on a second end region of the bar-shaped mount of the illuminating device.

11. The cyclone separator according to claim 10, wherein an edge protector is formed on the first end region of the bar-shaped mount of the illuminating device, and wherein the rotational axis of the hinge joint lies on an outer edge of the bar-shaped mount of the limit stop.

* * * * *